W. C. SMITH.
FORMER FOR MATRICES FOR USE IN THE RESTORATION OF TEETH.
APPLICATION FILED JAN. 23, 1917.
1,304,396.                                              Patented May 20, 1919.
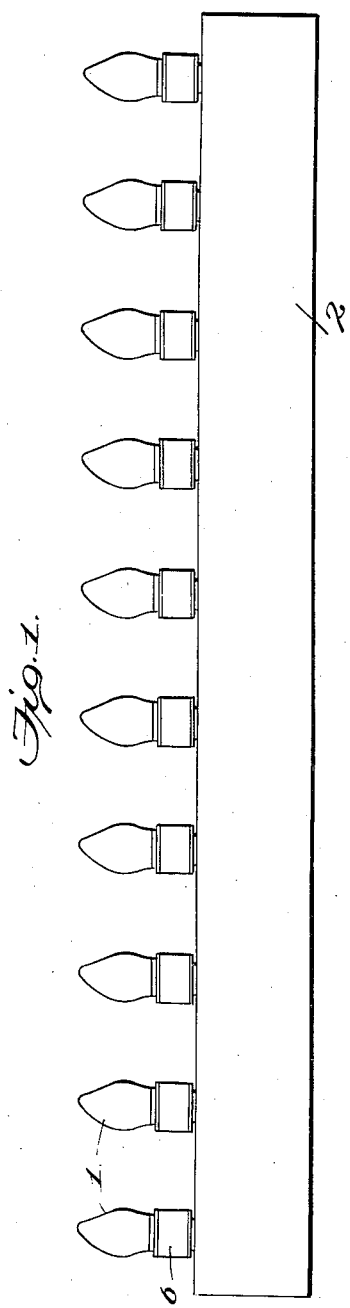
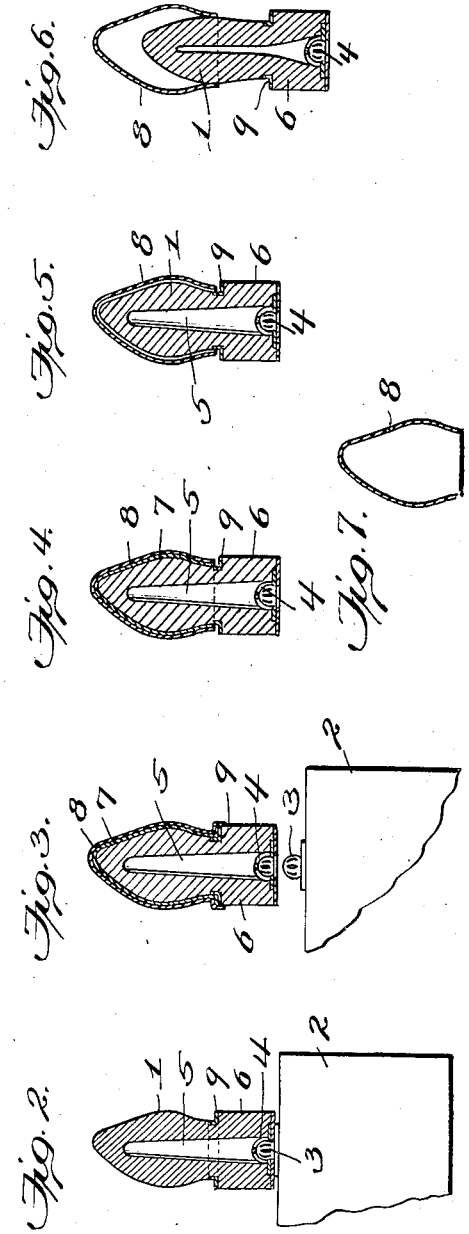
Witnesses:
Inventor
William C. Smith
by
Attorney

UNITED STATES PATENT OFFICE.

WILLIAM C. SMITH, OF MILFORD, DELAWARE, ASSIGNOR TO THE L. D. CAULK COMPANY, OF MILFORD, DELAWARE, A CORPORATION OF DELAWARE.

FORMER FOR MATRICES FOR USE IN THE RESTORATION OF TEETH.

1,304,396. Specification of Letters Patent. Patented May 20, 1919.

Application filed January 23, 1917. Serial No. 143,995.

*To all whom it may concern:*

Be it known that I, WILLIAM C. SMITH, a citizen of the United States, residing at Milford, in the county of Kent and State of Delaware, have invented new and useful Improvements in Formers for Matrices for Use in the Restoration of Teeth, of which the following is a specification.

This invention relates to formers for matrices for use in the restoration of teeth.

The matrix to the manufacture of which the present invention is applied is disclosed in U. S. Letters Patent to Frederick S. Welden, No. 996,818, dated July 4, 1911; and it consists of a non-metallic material which will have no oxidizing or chemical effect on the cement used in the restored tooth and which is shaped to mold a cement crown upon a tooth remnant which is specially prepared to interlock with the crown molded thereon. Restored teeth produced by the device of the Welden patent referred to are practically as durable as natural teeth and cannot be detected except by expert examination from the natural teeth which they may adjoin.

The principal object of the present invention is to provide a former by which matrices of the character disclosed can be produced rapidly, economically, and accurately in any shape desired and, as will be necessary in many instances, with their open ends of less diameter than portions of their bodies.

With the above objects in view, the invention consists in the novel structure of the matrix former or forming die and also in certain features involving its combination with a carrier.

The invention is illustrated in the accompanying drawings, wherein:

Figure 1 is an elevation showing a number of matrix forming cores ready for use;

Fig. 2 is a sectional view showing in detail the relation between one of the matrix forming cores and the bar upon which the said core is detachably mounted;

Fig. 3 is a sectional view showing the matrix as molded on the core;

Fig. 4 is a sectional view showing a matrix with its open end trimmed along a regular edge;

Fig. 5 is a sectional view showing a matrix ready for removal from the core;

Fig. 6 is a sectional view showing the manner of removing the matrix from the core; and Fig. 7 is a sectional view of the matrix *per se.*

Similar characters of reference designate corresponding parts throughout the several views.

The essential characteristics of the core upon which the matrix is formed are that it shall normally be of stable form and that its material shall be selected to enable its convenient withdrawal from the matrix, without distortion of the latter, even in those cases where the matrix, as herein shown, has its open end of less diameter than portions of its body. A core composed of rubber of the character or grade used in ordinary dental work will have a measure of flexibility necessary for its removal from the matrix yet it will, nevertheless, be stable in form when not subjected to any distorting stresses, and hence will answer the above requirements and will be within the scope of the invention. Such a core is shown herein by way of example and is designated 1.

The manufacture of the matrices will be greatly facilitated by mounting a number of the cores 1 upon a common carrier and by providing for the removal of these cores from such carrier. As shown, the carrier consists of a straight bar 2 of wood or metal and the cores will be mounted in suitable number upon this bar. The drawings show the bar 2 provided with ten of the cores 1. Ball-and-socket fastenings are preferably employed as the means of connection between the bar 2 and the cores. Accordingly, the bar 2 has secured to one of its faces a number of ball members 3 and each core is provided with a companion socket member 4. The flexibility of the core to enable its disengagement from the formed matrix will be increased by providing the core with an axially located recess 5 which extends to the end face of the core shank 6; and the socket members 4 are preferably arranged in the ends of the recesses 5. The cores are mounted upon the bar 2 by engaging the socket members 4 over the ball members 3 in the well known manner.

In making the matrices the cores are first dipped into a solution of soluble material, such as gelatin, and thereby receive a transitory coating 7 which sets very rapidly, i. e., within a minute or so after the withdrawal of the cores from the solution.

After the coating 7 has set upon the cores 1, the cores are dipped into a solution of the material of the matrix, preferably a suitable pyroxylin compound, such as celluloid; and thereby a matrix coating 8 is imposed on the coating 7 and, like the latter, sets within a minute or so after the core is withdrawn from the solution.

The shank 6 forms an annular shoulder with the body of the core and adjacent this shoulder there is secured a steel ring 9 of angular cross section whose function is to facilitate the trimming of the open end of the matrix and to prevent cutting of the material of the core while the matrix is being trimmed. After the matrix coating 8 has set, its open end is trimmed along a regular edge and the portions of the matrix coating adhering to the shank 6 are suitably stripped therefrom with the result that the matrix and gelatinous coatings will have the form shown in Fig. 4.

Thereupon, the cores are deposited in a bath of liquid which attacks the transitory material 7 but does not attack the matrix coating 8. Where the material 7 is gelatin, the liquid will be warm water. As a matter of convenience, the cores remain on the bar 2 during the dipping operations and during the trimming of the matrix coating; but they are thereafter disengaged from this bar, as shown in Fig. 4, in order that they may be deposited in large quantities in the liquid bath. The action of this bath is to melt or soften the transitory material 7 which, when softened or melted in greater part provides a spacing between the mating coating 8 and the core 1 and forms within this space a kind of lubricant by virtue of which the withdrawal of the core from the matrix is greatly facilitated. Fig. 5 shows the gelatinous coating 7 as absent, in stable form, from between the matrix and the core, by virtue of the warm water bath described, and Fig. 6 shows the manner of disengaging or withdrawing the core from the matrix coating which, when trimmed in the manner described, constitutes the finished matrix, as shown in Fig. 7. The core 1 is readily withdrawn from the matrix by reason of its flexibility, aided, in the embodiment disclosed, by the spacing between it and the matrix and by the lubricant which the softened gelatinous coating 7 provides.

The resiliency of the cores insures that they will reassume the stable form in which they are molded; and consequently, the cores may be used over and over again. The form in which the matrices may be made is practically without limit. As a matter of fact, the matrices may be made in any form in which artificial teeth are usually made and which conforms to accepted dental standards.

I claim:—

A core for the manufacture of matrices for use in tooth restoration of normally stable form and capable of deformation to enable its removal from the matrix formed thereon in combination with a bar constituting a carrier for a plurality of such cores and a detachable connection including coacting fastening members carried by said core and bar respectively.

In testimony whereof I have hereunto set my hand in presence of two subscribing witnesses.

WILLIAM C. SMITH.

Witnesses:
JOSIE A. SHEW,
EMMA W. DAVIS.